Figure 1:
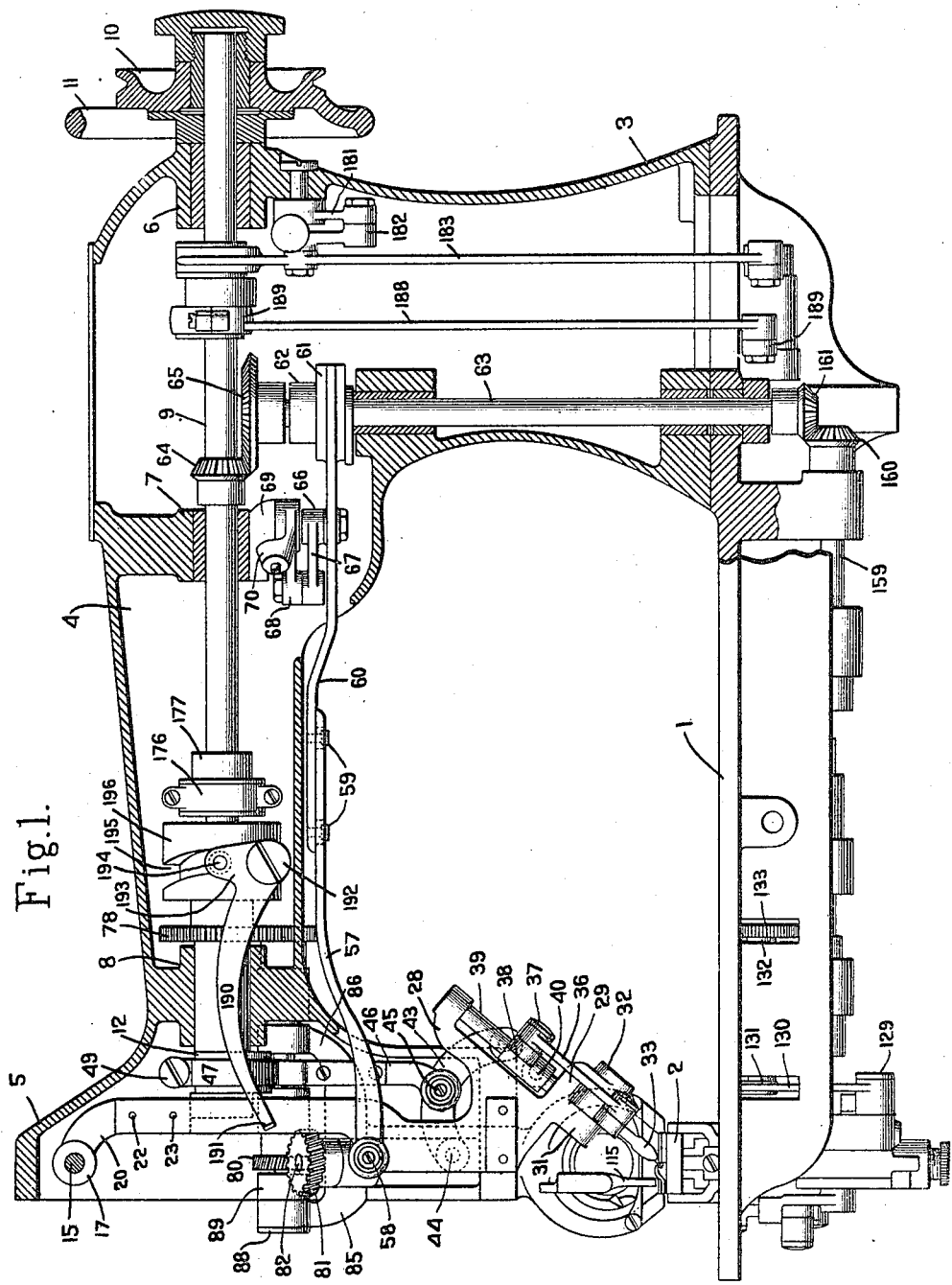

T. J. HAYES.
BLINDSTITCHING MACHINE FOR FELLING.
APPLICATION FILED APR. 9, 1914.
1,260,193.
Patented Mar. 19, 1918.
6 SHEETS—SHEET 3.
Fig. 3.
Fig. 4.
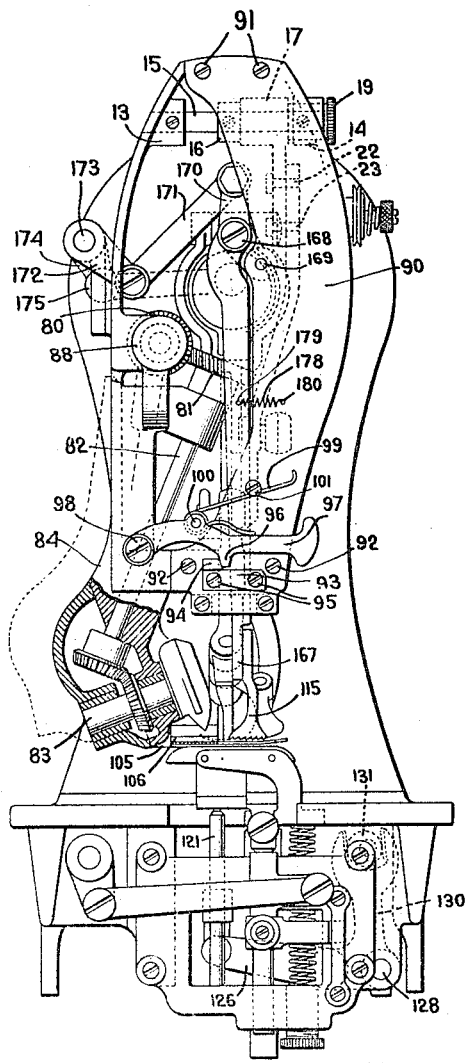
Fig. 5.
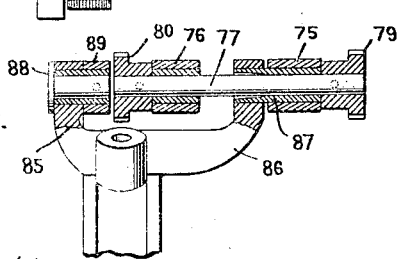
Witnesses.
J. Morrill Fuller
William E. Gagen
Inventor.
Thomas J. Hayes,
by Heard Smith & Tennant.
Atty's.

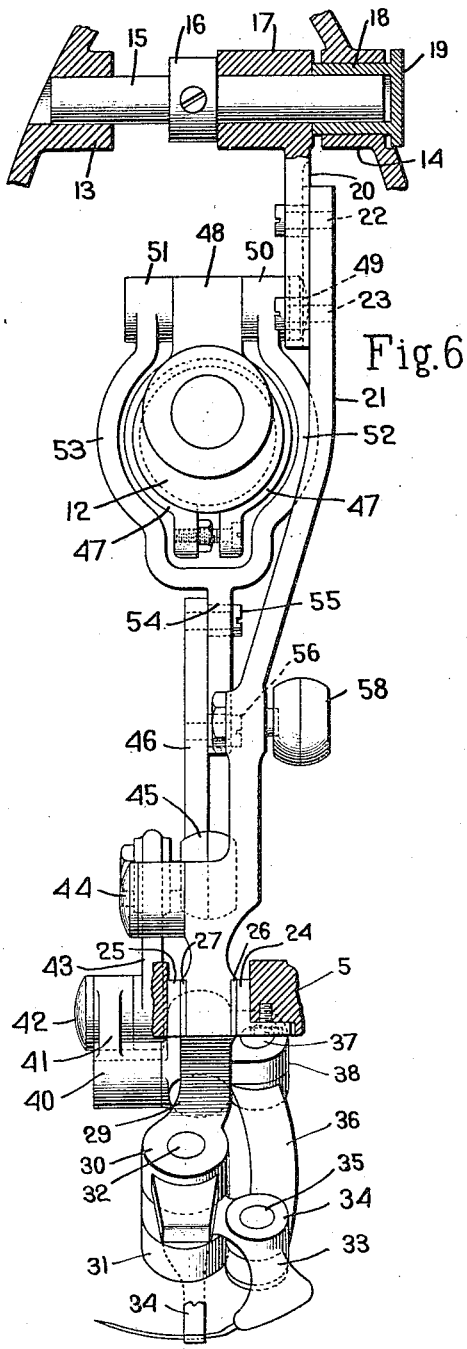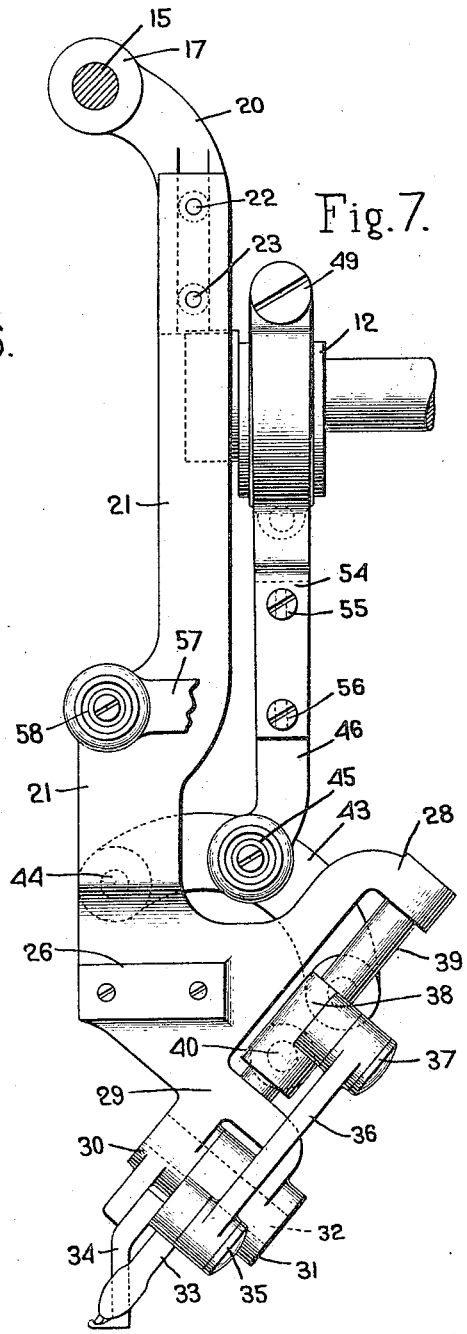

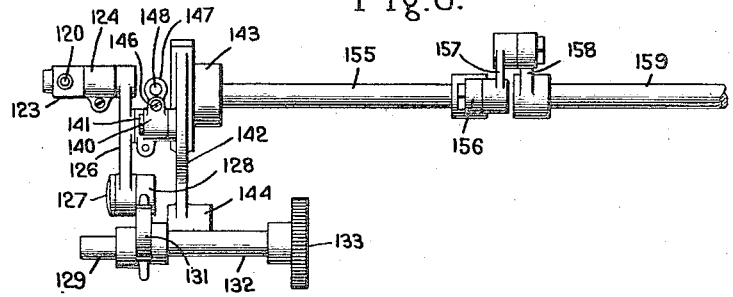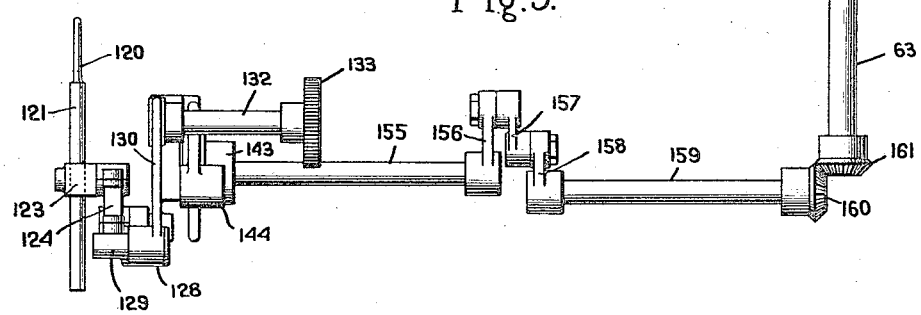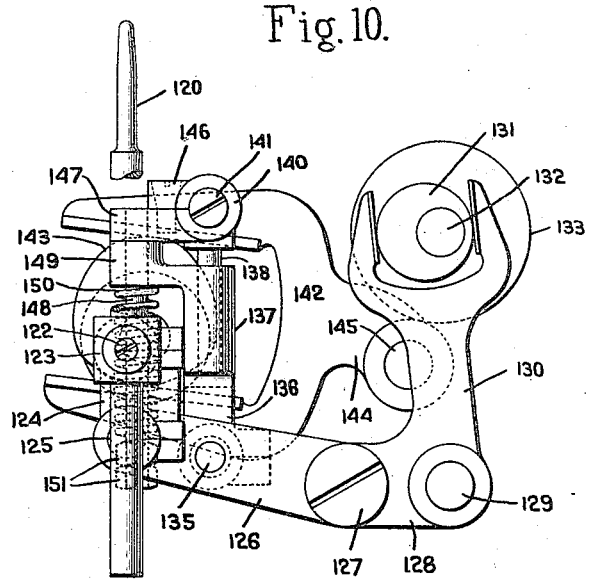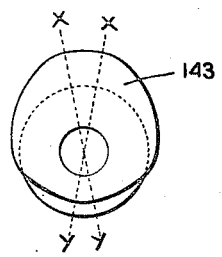

UNITED STATES PATENT OFFICE.

THOMAS J. HAYES, OF ROSLINDALE, MASSACHUSETTS, ASSIGNOR TO ARBETTER FELLING MACHINE COMPANY, OF BOSTON, MASSACHUSETTS, A CORPORATION OF MAINE.

BLINDSTITCHING-MACHINE FOR FELLING.

1,260,193.

Specification of Letters Patent.

Patented Mar. 19, 1918.

Application filed April 9, 1914. Serial No. 830,788.

*To all whom it may concern:*

Be it known that I, THOMAS J. HAYES, a citizen of the United States, and resident of Roslindale, county of Suffolk, State of Massachusetts, have invented an Improvement in Blindstitching-Machines for Felling, of which the following description, in connection with the accompanying drawing, is a specification, like characters on the drawing representing like parts.

This invention relates to improvements in sewing machines for blind stitching for felling and for padding work and is especially applicable to machines of the Arbetter type in which the stitch forming mechanism comprises a curved oscillating needle and means for relatively moving the needle and the work laterally to produce two parallel lines of stitches, one in the base layer of the fabric and the other in the superimposed layer.

In order to simplify the stitch forming mechanism and to provide a ready and accessible means for adjusting the same and assembling and also to give the machine a wider scope of operation it has been found desirable to support the needle carrying mechanism from a pivot in the upper portion of the head of the machine so that the same may be oscillated around said pivotal support in the shogging of the needle to form the parallel rows of stitching. By forming the link connecting the pivotal bearing to the needle carrier in two relatively adjustable parts the entire needle mechanism may be adjusted toward and from the presser foot so that the needle may be positioned accurately in respect thereto without the necessity for the careful machine work which would be required if the needle supporting means were without adjustment, and one of the objects of the invention has been to produce suitable pivotal needle supporting means to accomplish this result.

Another object of the invention is to provide a swinging hook bracket to permit the work to be removed from its normal position in the machine for the purpose of replacing the bobbin in the hook.

Another object of the invention is to provide a bender mechanism for the base layer of the fabric in which the bender will be retained practically stationary at its extreme upward position a sufficient length of time to permit the needle to enter well into the bent up portion of the fabric, and will then be rapidly withdrawn from its upwardly projected position to permit the free forward movement of the feeding mechanism and of the work carried thereby.

Another object of the invention is to provide means for conveniently adjusting the bender, operable from the top or the side of the base plate.

Other objects of the invention will more fully appear from the following description and drawing and will be particularly pointed out in the annexed claims.

Figure 2:
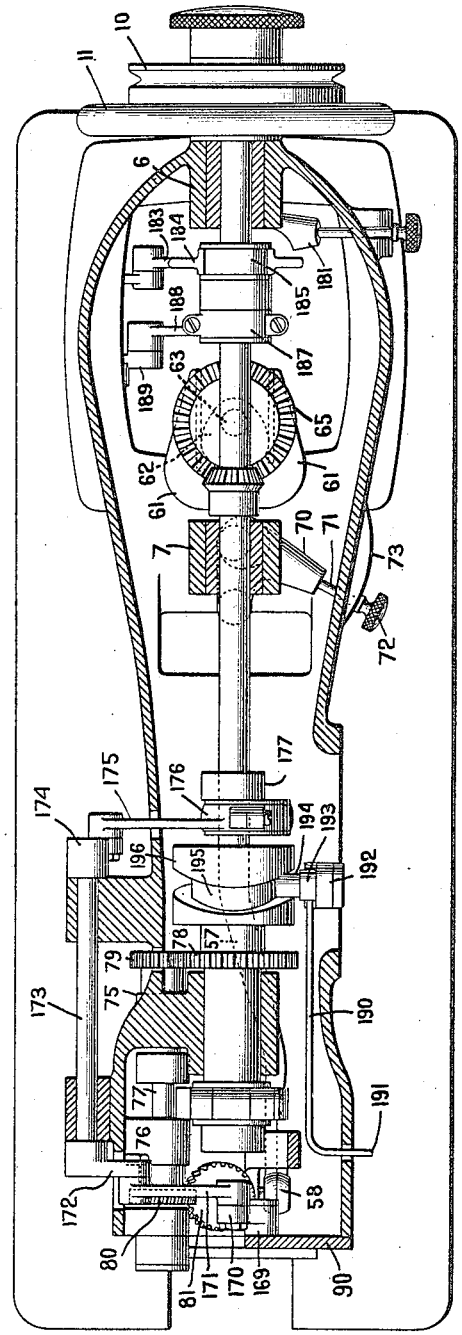
Figure 12:
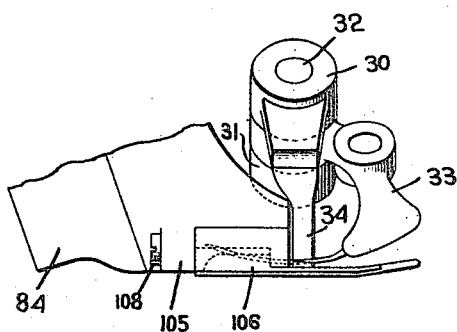
Figure 13:
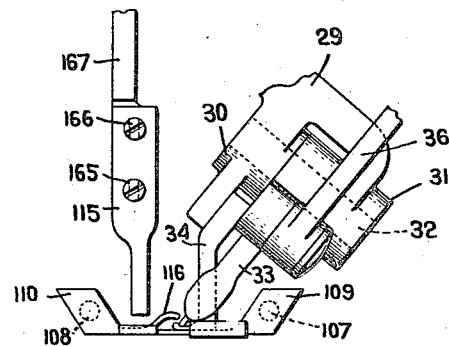
Figure 14:
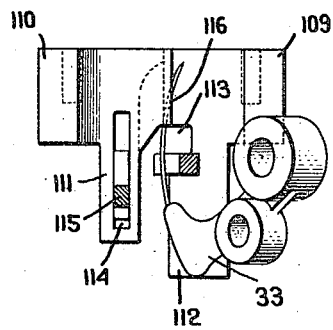
Figure 15:
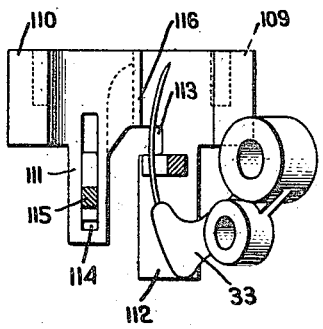

In the drawings:

Figure 1 is a vertical longitudinal sectional view of the standard arm and head of a sewing machine embodying a preferred form of my invention, the bed plate and certain portions of the stitch forming mechanism being shown in elevation, Fig. 2 is a horizontal sectional view of the axial plane of the main shaft, the shaft and mechanisms operated thereby being shown in elevation, Fig. 3 is a front elevation of the head with the cover plate removed to disclose the stitch forming mechanism contained within said head, Fig. 4 is a view of the opposite or rear end of the sewing machine a portion of the standard and arm being broken away to show the means for adjusting the feeding mechanism, Fig. 5 is a detail view of the hook carrying bracket, showing the manner in which it is supported upon the countershaft which drives the hook, Fig. 6 is a side elevation in detail of the needle supporting and operating mechanism, Fig. 7 is a front elevation of the same, Fig. 8 is a detail plan view of the bender mechanism, Fig. 9 is a detail front view of the same, Fig. 10 is an enlarged detail end view of the bender mechanism showing the cams for actuating and for adjusting the same, Fig. 11 is a detail view of a specially designed cam for actuating the bender, Fig. 12 is a detail side elevation of the presser foot mechanism showing the relative position of the curved oscillating needle thereto and the means for supporting the presser foot on the hook bracket, Fig. 13 is a front elevation of the same showing also the relation thereto of the upper feed dog, Fig. 14 is a plan view of the same showing the oscillating needle in the position in which it penetrates the superimposed layer of fabric in felling, and Fig. 15 is a similar view showing the relative position of the needle and presser foot when the needle has penetrated the base layer of the fabric.

A preferred embodiment of my invention is illustrated herein as incorporated in substantially the usual form of sewing machine frame or casing having a base plate 1 provided with the usual work support 2 at its front end and at its rear end with a hollow standard 3 suitably secured thereto and rising therefrom and provided with a hollow arm 4 the axis of which is parallel to the plane of the bed plate and which terminates in the usual head 5 which contains the needle actuating mechanism and the mechanism for operating the hook.

The arm 4 is provided at its rear end, its middle portion, and adjacent to the head with bosses 6, 7, and 8 which contain alined bearings for the main shaft 9. The shaft 9 is provided at its rear end with the usual driving pulley 10 and hand wheel 11 and at its forward end with a suitable cam 12 for operating the oscillating needle, the intermediate portion of the shaft being provided with suitable cams and gears to actuate the complemental stitch forming mechanism, the take-up, feed mechanism, and the bender, as will hereinafter be described.

The head 5 of the machine may be provided near its upper end with a pair of inwardly projecting bosses 13, 14 forming supports for a shaft 15 adapted to support the needle mechanism so that the same may be vibrated upon said shaft to form the parallel rows of stitches in felling or padding work. The shaft 15 is located in the vertical plane of the direction of feed of the goods so that the vibrating needle, in forming the parallel rows of stitches, will penetrate the goods at equal distances on either side of said vertical plane. The shaft 15 may desirably be provided with a collar 16 adjustably secured thereon by means of a set screw to provide for the accurate positioning of the sleeve 17 which supports the needle carrying mechanism. In order to provide for the accurate adjustment of the sleeve 17 it is found desirable to mount the end of the shaft 15 within a sleeve 18 having a suitable milled head 19 said sleeve passing through the boss 14 and abutting against the face of the sleeve 17 so that any wear may be taken up and the needle supporting sleeve maintained accurately in its proper position upon the shaft 15.

The sleeve 17 is desirably provided with a downwardly extending integral arm 20 adjustably secured to the member 21 which supports the oscillating needle, suitable adjusting screws 22, 23 passing through slots in the arm 20 and seated in the member 21, being provided to connect the arm 20 to the member 21 so that the entire needle mechanism may be readily adjusted vertically in respect to the plane of the presser foot or needle plate. This permits the accurate assembling of the parts without the careful machine work which otherwise would be necessary to position the needle properly in respect to the presser foot plate and complemental stitch forming mechanism.

The member 21 which is illustrated herein is offset to avoid the end of the main shaft and its lower end is so disposed as to come immediately beneath the axis of the shaft 15. It is also offset laterally in order to bring the lower portion thereof into the proper plane in relation to the work plate.

The lower portion of the head 5 is slotted and is desirably provided with wear plates 24, 25 adapted to engage oppositely disposed wear plates 26, 27 carried by the needle supporting member 21 and to guide said member in its oscillation to form the parallel rows of stitches. The member 21 is provided at its lower portion with a head having lateral extensions 28, 29 to support the mechanism for oscillating the needle.

These extensions 28, 29 are desirably disposed at an angle to the plane of the bed plate as illustrated in Figs. 1 and 7. The lower extension 29 is desirably bifurcated to form bearings 30, 31 for the shaft 32 upon which the oscillating needle bar 33 is pivotally mounted. The needle bar is desirably of a curved or arcuate form and provided with the usual head and nose to support a curved needle having a thread groove in its convex surface as is usual in machines of this character.

The bearing 30 may be provided with an extension or ear adapted to support rigidly a needle guide 34 having a recess to receive and direct the oscillating needle.

The needle bar 33 is provided intermediate of its ends with a stud 35 by which it is connected to a link 36 leading to a stud 37 projecting from a cross head 38 slidably mounted upon a preferably cylindrical shaft 39 connecting the extensions 28 and 29. The cross head is provided upon its opposite side with a stud 40 to which is attached a short link 41 having suitable connection 42 to the end of a lever 43 which is pivoted at its opposite end upon a stud 44 projecting laterally from the member 21. The lever 43 is desirably arcuate in form and is provided at approximately its middle with a universal connection 45 by which it is connected to the lower end of a link 46 leading to the needle operating cam 12.

By reason of the fact that the needle is given a vibrating shogging movement in addition to the oscillation of the needle itself it is necessary that means be provided whereby the cam 12 will not be bound or interfered with by the shogging of the needle. In order to accomplish this result the cam strap 47 is split and is provided with an upward projection 48 adapted to receive a stud 49 by means of which it may be attached to bearings 50, 51, in the upper ends of the arms 52, 53 of a yoke having a shank 54 adjustably secured to the link 46 by suitable means such as screws 55, and 56 so that the field of oscillation of the needle may be varied to cause proper coöperation with the revolving hook or other complemental stitch forming mechanism.

In the operation of the machine the rotation of the cam 12 will raise and lower the link 46 thereby rocking the lever 43 about its pivotal stud 44 causing the opposite end of said lever to reciprocate the cross head 38 through the link 41, and the reciprocation of said cross head serves, through the link 36 to oscillate the curved needle.

By this construction a very rigid relation is always maintained between the needle and its supporting mechanism and the wearing of the parts by use cannot materially affect the accurate movements of the needle.

In order to shog the needle to produce the parallel rows of stitches the needle carrying mechanism is vibrated about its pivotal shaft 15. This is accomplished by means of a link 57 suitably connected by a ball joint coupling 58 to the needle supporting member 21 and desirably adjustably connected by a screw and slot connection 59 to an extension 60 which is provided with a bifurcated end 61 adapted to embrace a cam 62 located upon a vertical countershaft 63 suitably driven from the main shaft 9 by gears 64, 65 having the two to one ratio necessary to produce the proper coördination with the stitch forming mechanism in the parallel lines of stitching.

In order to provide for the adjustment of the amplitude of vibration of the needle supporting member 21, means are provided herein for adjusting the longitudinal movement of the link 57, 60. In order to accomplish this purpose the link 60 is provided adjacent its rear end with a stud 66 forming a pivotal connection for a link 67 which is connected at its opposite end to the end 68 of one arm of a bell crank lever which is pivoted upon an extension projecting downwardly from the boss 7, the other arm 70 of the bell crank lever is provided with an extension 71 projecting through a slot in the arm 4 and is provided at its end with a thumb nut 72 adapted to be clamped against the arcuate walls 73 of the slot.

The adjustment of the arm 71 changes the relative position of the pivotal support of the link 67 in respect to the axis of the link 60 thereby causing a greater or less longitudinal movement of said link as the link is vibrated laterally by the cam 62.

The mechanism thus described for supporting and actuating the needle is exceedingly simple in character and is found to be very effective. The radius about which the needle is vibrated in its shogging movement is of such relatively great length that the arc through which the needle moves does not vary greatly from a straight line and since the needle oscillates to form the respective stitches in the superimposed and the main layer of the fabric at equal distances from the median line of its vibration no difficulty is experienced in obtaining the proper coördination with the revolving hook.

Another important feature of this invention resides in the mechanism for supporting and for actuating the revolving hook. In the preferred embodiment shown herein the entire hook bracket is pivotally supported upon a countershaft through which the revolving hook is driven so that the hook may be swung laterally from its normal position to permit the insertion and removal of the bobbin, the construction also permitting the hook bracket to be easily removed from the machine.

The forward portion of the arm is provided with bosses 75, 76 forming the journals for a countershaft 77 which extends parallel to the main shaft 9 and is driven therefrom by a suitable gear 78 carried by the main shaft and which meshes with a gear 79 upon the end of the countershaft 77. At its opposite end the countershaft 77 is provided with a preferably spiral gear 80 which meshes with a companion gear 81 upon the end of a shaft 82 which is provided at its lower end with a beveled gear meshing with a companion gear on the shaft 83 of the revolving hook. (Figs. 1, 2, 3, and 5.)

The shafts 82 and 83 are mounted in the hook bracket 84 which desirably is of a curved construction such as shown in Fig. 3 and is provided at its upper end with a yoke having arms 85 and 86, the arm 86 being desirably journaled upon the sleeve 87 which is mounted in the bearing member 75. The opposite arm 85 is desirably supported upon a removable stud 88 secured to a boss 89 projecting downwardly from the interior of the head, the axis of the stud 88 being in alinement with the axis of the shaft 77. By the construction thus described it will be observed that the yoke is pivotally mounted upon an axis coincident with the axis of the shaft 77 so that the entire hook bracket may be swung aside without disconnecting it from the driving mechanism.

In order to maintain the hook bracket normally in position to coöperate with the oscillating needle I have provided a latch for securing the bracket firmly against the main portion of the head. To accomplish this and also for other purposes which will hereinafter be pointed out I have provided the head of the machine with a segmental plate 90 which may desirably be secured to the top and bottom thereof by screws 91 and 92. A latch 93 having an upward projection or lug 94 is desirably secured to the lower part of the segmental plate by suitable screws 95, said lug being adapted to engage a shouldered projection 96 carried by a latch 97 pivotally secured upon a stud 98 carried by the hook bracket. The latch is normally maintained in engagement with the lug 94 by a spring 99 which is coiled about a stud 100 on said latch 97 while the opposite end passes beneath a screw 101 projecting from the plate 90, the end of the spring 99 being desirably curved upwardly to limit the lateral movement of the hook bracket about its pivotal support.

In order to swing aside the hook bracket for the insertion or replacement of the bobbin it is merely necessary for the operator to raise the end of the latch 97 so that the projection 96 will be free from engagement with the lug 94 whereupon the hook bracket may be swung sidewise sufficiently to permit the easy insertion and removal of the bobbin. To replace the same it is merely necessary to swing the hook bracket into place, whereupon the latch will automatically reëngage with the lug 94 retaining the same in operative position.

The lower portion of the hook bracket is provided with a shoulder extension 105, (Fig. 12) to receive the end of the presser foot 106 to which it is secured, desirably by screws 107 and 108 extending through the projection 105 into the rear end of upwardly and outwardly disposed side portions 109 and 110 on said presser foot. The presser foot 105 is provided with forwardly extending toes 111 and 112 on opposite sides of the usual throat opening 113, the toe 111 being preferably provided with a slot 114 adapted to receive the upper feed dog 115 which will be hereinafter described. The middle portion of the presser foot is slotted and the outer wall of the slot curved upwardly and laterally to form a ledge 116 beneath which the oscillating needle may pass in the reciprocation in which it penetrates the superimposed layer of the fabric and the plane of the remaining portion of the presser foot is sufficiently low to permit the lateral movement of the needle without interfering therewith. The position of the presser foot and of the needle in relation thereto when the needle is penetrating the superimposed layer is shown in Figs. 12 and 14 of the drawings herein, and the relative position of the needle and presser foot when the needle is making the stitch in the main layer of the fabric is illustrated in Figs. 13 and 15, it being understood of course that in the latter instance the lower layer of material is thrust upwardly into the path of the oscillating needle by a suitable bender mechanism.

The bender mechanism comprised in this invention is of a novel character and is adapted to maintain the lower layer of fabric stationary in its bent up condition a sufficient length of time for the needle to penetrate well into the fabric, preferably until the point of the needle has passed across the throat opening in the needle plate thus insuring uniformity of depth of penetration of the fabric and in the length of stitch. The bender is then quickly withdrawn to a point well beneath the work plate to permit the free forward movement of the feed dog.

The bender mechanism, which is illustrated in its position in the machine in Fig. 3 and in detail in Figs. 8, 9, 10 and 11, comprises a cylindrical bender 120 slidably mounted in the work support 2 so that its end may be raised directly beneath the path of the needle in the movement of the latter to form a stitch in the base layer of the fabric, the upward movement of the bender thereby so presenting the fabric to the needle as to cause the latter to penetrate and to emerge from the upper surface of the fabric.

In the preferred embodiment of the invention illustrated herein the bender 120 comprises a cylindrical projection at the upper end of a stem 121 which is adjustably secured by a screw 122 in a collar 123 having a laterally extending stud by which it is pivotally connected to the upper end of a link 124, which is pivoted at its lower end upon a stud 125 projecting from the end of a substantially horizontal link 126 which is in turn pivoted at its opposite end to a stud 127 projecting from an arm 128 of a bell crank adjusting lever. The bell crank lever is pivoted upon its elbow upon a stud or lug 129 projecting from a depending portion of the sewing machine base. The other arm 130 of the bell crank lever preferably extends upwardly and is forked at its upper end to embrace a cam 131 carried upon a suitable short shaft 132 journaled in lugs (not shown) extending downwardly from the base plate, the shaft 132 being provided with adjusting means such as a milled disk 133, a portion of which projects through the bottom or side of the machine base at a point easily accessible to the operator. By rotating the milled disk 133 and its attached shaft the cam 131 may be caused to rock the bell crank to raise and lower the end of the arm 128 and consequently to adjust the position of the bender to determine the depth to which the needle will penetrate the base layer of fabric.

The bender is preferably reciprocated through yieldable connections by a special cam which is adapted to give the bender quick rising and lowering movements and to maintain it stationary at the extreme upper and lower positions of its throw through the following instrumentalities.

The link 126 which connects the bender to the end of the bell crank arm is provided near its middle with a stud or bolt 135 by which it is attached to the offset end 136 of a vertical member 137 which is slidably mounted on a guide 138 depending from a member 140 which is secured to a stud 141 projecting from the upper arm of the yoke 142 which embraces a specially designed cam 143. The yoke 142 is provided with an extension 144 which is pivoted at its end to a suitable stud 145 on the bed plate of the machine.

The member 140 preferably is in the form of a split collar adapted to embrace the stud 141, the ends of the collar being secured together by a suitable screw 146 which may serve to take up wear upon the stud 141. The member 140 preferably is provided with a lateral extension 147 which supports a downwardly extending cylindrical guide 148 which is arranged in parallelism with the guide 138 and passes through a boss 149 in a lateral extension of the sliding member 137. A helical spring 150 surrounding the guide 148 normally supports the upper end of the boss 149 against the end face of the extension 147 of the member 140. The lower end of the guide 148 is threaded to receive suitable set nuts 151 and 152 whereby the tension of the spring 150 may be adjusted to operate properly upon goods of various character without unduly straining the same.

The cam 143 as before stated is specially designed so that the highest and lowest portions thereof $x$—$x$ and $y$—$y$ are concentric with the axis of the shaft upon which it is mounted, thus forming dwells adapted to hold the bender stationary at the highest and lowest points of its movement. The purpose being as before stated to maintain the bent up portion of the fabric stationary during its presentation to the needle.

In operation the rotation of the cam 143 causes the oscillation of the yoke 142 and attached member 140 with its depending guides 138 and 148. This movement of the yoke is transmitted through the member 137 to the link 126 which being connected to the bender by the link 124 and collar 123 raises and lowers the bender as desired. If the bender encounters any obstacle such as a seam in its upward movement the spring 150 will yield in such a manner as to avoid injury to the fabric.

It is desirable that the bender should be maintained in its extreme elevated position during the time required for the needle to enter well into the bent up portion of the fabric and then rapidly withdrawn to permit the proper operation of the feeding mechanism. In order to accomplish this purpose the cam shaft which actuates the bender is desirably driven at a variable speed during its rotation so that the upward thrust through the work support will be rapid, the bender then held stationary in its extreme upward position, during the dwell of the cam 143, then withdrawn rapidly from the goods and out of the path of the advancing feed dog and during the remaining portion of its cycle moved at a relatively low speed.

In the preferred embodiment of the invention illustrated in Figs. 8 and 9 the cam 143 is mounted upon a suitable shaft 155 suitably supported in bearings not shown, projecting downwardly from the under surface of the bed plate. The shaft 155 is provided with an arm 156 which is connected to one end of a link 157 the opposite end of which is connected to the end of a similar arm 158 which extends laterally from a shaft 159 which likewise is mounted in lugs projecting downwardly from the underside of the bed plate, the shafts 155 and 159 being arranged in parallelism but in different planes and having their ends closely adjacent to one another so that the link 157 which connects the arms 156 and 158 will cause a differential relative rotation of the shafts. The shaft 159 is provided at its end with a beveled gear 160 which meshes with a corresponding beveled gear 161 upon the end of the vertical countershaft 63. It will be remembered that the shaft 63 is driven through gears 64, 65 from the main shaft and that these gears have a two to one relation so that it is obvious that the bender will be raised upon every second revolution of the main shaft. The mechanism for vibrating or shogging the needle laterally is actuated from the same countershaft, 63, which actuates the bender and it therefore follows that a proper coördination between the needle mechanism and the bender mechanism will always be maintained.

It is very important in overseaming work that the base layer of the fabric and the superimposed layer which is being attached thereto be advanced with absolute uniformity to prevent wrinkling or puckering of the superimposed layer. In order to insure this result an upper feed is desirably provided which is actuated by the lower or main feed. I have designed a novel form of upper feeding mechanism which is adapted to be used in connection with the stitch forming mechanism herein disclosed but the subject matter of this feeding mechanism will be made the subject of a divisional application, it will therefore be described briefly in this case merely for the purpose of completing the general description of the machine.

The upper feed dog 115 heretofore referred to is adjustably connected by screws 165, 166, to the lower end of a link 167 which is desirably offset in such a manner as to avoid an interference with the end of the main shaft 9 and is connected at its upper end to a stud 168 projecting from the elbow of a bell crank lever having diverging arms, the end of the lower arm of which is pivoted to the stud 169 extending inwardly from the segmental plate 90 which is attached to the front end of the head. The other, or upwardly projecting arm 170 of said bell crank lever is pivotally connected to one end of a link 171, the opposite end of which is pivotally connected to a suitable stud projecting laterally from the end of an arm 172 which is secured to a countershaft 173 mounted in suitable bosses extending laterally from the side of the head portion and arm of the sewing machine frame. The rear end of the countershaft 173 is provided with a crank arm 174 which is suitably pivoted at its free end to one end of a link 175, the opposite end of said link being provided with a cam strap 176 embracing a cam 177 suitably secured to the main shaft. In the operation of the machine the rotation of the main shaft causes the reciprocation of the link 175 through the cam 177 rocking the countershaft 173 and consequently oscillating the link 171 and the bell crank lever so that its elbow 168 will be lowered and raised to cause the feed dog to engage the work and to be moved therefrom.

The reciprocation of the upper feed dog is timed to coöperate with the mechanism which raises and lowers the under feed dog so that the upper and lower feed dogs will approach each other to clamp the work. The lower feed dog will thereupon be moved forward to feed the goods carrying the upper feed dog with it to the end of its stroke. Upon the downward movement of the lower feed dog the upper feed dog will be raised from engagement with the work and may be restored to its normal position by means of a spring 178 which may be secured at one end to a stud 179 projecting from the link 167 which carries the upper feed dog and at its other end to a pin or stud 180 secured to the inner side of the segmental plate 90.

The amplitude of vibration of the lower feed dog may be controlled through a bell crank and link adjustment 181, 182 connected to a floating link 183 having a yoke 184 embracing a cam 185 upon the main shaft adjacent to the rear end of the machine, the link 183 serving to oscillate the shaft 186 which transmits the forward and backward movement to the lower feed dog.

The up and down movement may be given to the lower feed dog through any suitable mechanism but said dog is preferably actuated by a cam 187 on the main shaft which operates a link laterally from a sleeve which surrounds the shaft 186 and which at its opposite end is connected with toggle mechanism (not shown) for causing the raising and lowering of the feed dog.

Inasmuch as this mechanism forms the subject matter of a companion application Serial No. 830,790 filed April 9, 1914, it is unnecessary to illustrate it or to describe it in detail.

Any desirable form of take up may be used in connection with the mechanism hereinafter described. I have however illustrated a particular form herein in which the entire take-up mechanism except the end of the take up arm which engages the thread is inclosed within the head and arm of the sewing machine. The take-up as illustrated herein comprises a bell crank lever the long arm 190 of which is provided with a lateral projection 191 extending through the side of the machine and having the usual eye for the thread, said bell crank arm 190 being pivoted at its elbow upon a stud 192 projecting from the inner side of the sewing machine arm the other arm of the take up lever, 193, being provided with a stud surrounded by an anti-friction roller 194 arranged to travel in a cam slot 195 in a sleeve 196 suitably secured to the main shaft 9.

It is to be understood that the embodiment of my invention disclosed herein is illustrative merely and is not in any way restrictive and that my invention embraces broadly the novel elements and combinations shown or described and particularly pointed out in the following claims.

Having thus described my invention what I claim as new and desire to secure by Letters Patent is:

1. In a sewing machine for blind stitching comprising a work support, means for feeding the work across the same, a curved needle pivotally mounted to oscillate in substantially the direction of feed and complemental stitch forming mechanism and means for actuating the same; a supporting member for the needle pivoted upon an axis lying substantially parallel to the direction of feed and means for vibrating said supporting member laterally to form parallel rows of stitching.

2. In a sewing machine for blind stitching comprising a work support, means for feeding the work across the same, a curved needle pivotally mounted to oscillate in substantially the direction of feed and complemental stitch forming mechanism and means for actuating the same; a supporting member for said needle pivotally mounted upon the shaft in the upper portion of the head of the machine, having its axis lying substantially parallel to the direction of feed and means for vibrating said supporting member laterally to form parallel lines of stitching.

3. In a sewing machine for blind stitching comprising a work support, means for feeding the work across the same, a curved oscillating needle, and complemental stitch forming mechanism and means for actuating the same; a shaft mounted in the head of the machine having its axis extending substantially parallel to the direction of feed, a needle supporting member having a sleeve journaled upon said shaft, adjustable means for preventing the longitudinal movement of said sleeve on said shaft and means for vibrating said needle supporting member laterally to form parallel rows of stitching.

4. In a sewing machine for blind stitching comprising a work support, means for feeding the work across the same, a curved oscillating needle, and complemental stitch forming mechanism and means for actuating the same; a shaft mounted in the head of the machine having its axis extending substantially parallel to the direction of feed, a needle supporting member having a sleeve journaled upon said shaft, means including an adjustable bushing surrounding said shaft engaging the end of said sleeve for preventing longitudinal movement of said sleeve on said shaft and for taking up wear and means for vibrating said needle supporting member laterally to form parallel rows of stitching.

5. In a sewing machine for blind stitching comprising a work support, means for feeding the work across the same, an oscillating needle and complemental stitch forming mechanism and means for actuating the same; a supporting member for the needle pivotally mounted in the upper portion of the head of the machine upon an axis lying substantially parallel to the direction of feed, a guideway for said member in the lower portion of the sewing machine head and wear plates detachably secured in said guideway engaging said supporting member whereby assembling of the parts and taking up wear is facilitated and means for vibrating said needle supporting member laterally to form parallel rows of stitching.

6. In a sewing machine for blind stitching comprising a work support and means for feeding the work across the same, a curved oscillating needle and complemental stitch forming mechanism and means for actuating the same, a member supporting said needle to oscillate in a plane obliquely inclined to the plane of the work support, means for pivotally supporting said member to permit lateral vibration of the needle whereby the needle may be caused to oscillate in different substantially parallel planes each of which is substantially parallel to the line of feed and inclined to the work supporting surface of the work support to form parallel rows of stitching.

7. In a sewing machine for blind stitching comprising a work support, and means for feeding the work across the same, a curved oscillating needle and complemental stitch forming mechanism and means for actuating the same, a supporting member for said needle pivotally mounted in the upper portion of the sewing machine head adapted to permit lateral vibration thereof, means for vibrating said needle laterally and means for varying the amplitude of vibration.

8. In a sewing machine for blind stitching comprising a work support and means for feeding the work across the same, a curved oscillating needle and complemental stitch forming mechanism and means for actuating the same, a pivoted supporting member for said needle adapted to permit lateral vibration thereof, means for vibrating said needle laterally, means for varying the amplitude of vibration comprising a floating lever, and means for adjusting the position of the fulcrum of said lever relative to a longitudinal axis thereof.

9. In a sewing machine for blind stitching comprising a work support and means for feeding the work across the same, a curved oscillating needle and complemental stitch forming mechanism and means for actuating the same, a supporting member for said needle pivotally mounted in the upper portion of the sewing machine head and means for adjusting the same to position the arc of oscillation of the needle toward or from the work supporting surface of the work support and means for vibrating said supporting member laterally to form parallel lines of stitching.

10. In a sewing machine for blind stitching comprising a work support and means for feeding the work across the same, a curved needle pivotally mounted to oscillate in substantially the direction of feed and complemental stitch forming mechanism and means for actuating the same, a supporting member for said needle pivotally mounted in the sewing machine head upon an axis extending substantially parallel to the direction of feed, said needle supporting member being formed in two sections and having adjustable means for securing said sections together whereby the arc of oscillation of the needle may be adjusted toward or from the work supporting surface of the work support and means for vibrating said supporting member laterally to form parallel rows of stitching.

11. In a sewing machine for blind stitching comprising a work support and means for feeding the work across the same, a curved oscillating needle and means for supporting the same including a pivotally supported laterally movable member having a depending head, a needle bar pivotally mounted in said head to oscillate in a plane inclined to the plane of the work support, means for oscillating said needle bar comprising a sliding member carried by said head, means for reciprocating said sliding member, means for vibrating said supporting member and complemental stitch forming mechanism adapted to coöperate with said needle.

12. In a sewing machine for blind stitching comprising a work support and means for feeding the work across the same, a curved oscillating needle and means for supporting the same including a pivotally supported laterally movable member having a depending head, a needle bar pivotally mounted in said head to oscillate in a plane inclined to the plane of the work support, means for oscillating said needle bar comprising a sliding member carried by said head, means connecting said sliding member to said needle bar, a lever connecting said sliding member to said supporting member and actuating means connected to said lever intermediate of its connection to said supporting member and said sliding member.

13. In a sewing machine for blind stitching comprising a work support and means for feeding the work across the same, a curved oscillating needle and means for supporting the same including a pivotally supported laterally movable member having a depending head, a needle bar pivotally mounted in said head to oscillate in a plane inclined to the plane of the work support, means for oscillating said needle bar comprising a sliding member carried by said head, means connecting said sliding member to said needle bar, a lever connecting said sliding member to said supporting member and actuating means connected to said lever intermediate of its connection to said supporting member and said sliding member and means for adjusting the field of oscillation of said needle whereby the needle will be caused to coöperate properly with the complemental stitch forming mechanism.

14. In a blind stitch sewing machine comprising a work support, means for feeding the work across the same, a curved oscillating needle and complemental stitch forming mechanism, needle supporting means comprising a laterally movable member having a depending head, a needle bar pivotally mounted in said head to oscillate in a plane inclined to the plane of the work support, means for oscillating said needle bar and a needle guide rigidly supported by said head and partaking of the movements thereof.

15. A sewing machine comprising a work support, an arm having a head overhanging said work support, a needle and complemental stitch forming mechanism carried by said head, a mainshaft located in said arm, means operated by said main-shaft to cause the oscillation of the needle, a countershaft mounted in said head in parallelism with said mainshaft, means pivotally mounted about the axis of said countershaft for supporting said complemental stitch forming mechanism, and means driven from said countershaft for actuating said complemental stitch forming mechanism.

16. A sewing machine comprising a work support, an arm having a head overhanging said work support, a needle and complemental stitch forming mechanism carried by said head, a mainshaft located in said arm, means operated by said mainshaft to cause the oscillation of the needle, a countershaft mounted in said head in parallelism with said mainshaft, a hook bracket pivotally mounted about the axis of said countershaft, a revolving hook carried by said bracket and gearing journaled in said bracket connecting said hook with said countershaft adapted to cause the rotation of said hook and to permit the bracket to be swung about the axis of the countershaft to provide for the insertion of the bobbin into the hook or the removal of the bobbin therefrom.

17. In a sewing machine for blind stitching comprising a work support and means for feeding the work across the same, a curved oscillating needle and complemental stitch forming mechanism located above the work support, means for actuating the same, a bender adapted to present the work in the path of the needle, a bender actuating cam having a dwell adapted to retain said bender at its highest elevation, and means for producing a variable movement in the rotation of the said cam whereby the bender will be quickly withdrawn from its upwardly projected position.

18. In a sewing machine for blind stitching comprising a work support and means for feeding the work across the same, a curved oscillating needle and complemental stitch forming mechanism located above the work support, a main support, and means for actuating the stitch forming mechanism therefrom, a bender, a bender actuating cam having a dwell adapted to retain said bender at its highest elevation, a shaft for said cam, a driving shaft disposed adjacent thereto in parallel relation to the cam shaft and means for rotating said driving shaft from the main shaft and means for imparting a differential rotation to said cam shaft from said driving shaft whereby the bender will be rapidly withdrawn from its upwardly projected position to permit the unobstructed advance of the feeding mechanism.

19. In a sewing machine for blind stitching comprising a work support and means for feeding the work across the same, a curved oscillating needle and complemental stitch forming mechanism located above the work support, means for actuating the same, a bender and means for actuating the same comprising a cam having a dwell adapted to retain said bender at its highest elevation, means for producing a variable movement in the rotation of said cam comprising two shafts disposed in different parallel planes and having radially extending arms connected by a suitable link, one of said shafts being connected to said cam and the other to a driving member.

20. In a sewing machine for blind stitching comprising a work support and means for feeding the work across the same, a curved oscillating needle and complemental stitch forming mechanism located above the work support, a vertical shaft, means for actuating the same, and means operated therefrom to vibrate the needle laterally, a bender and means for reciprocating the same comprising a cam having a dwell adapted to retain said bender at its highest elevation, means for producing a variable movement of rotation of the said cam comprising two shafts disposed in different parallel planes beneath and longitudinally of the bed plate and having radially extending arms at their adjacent ends connected by a link, one of said shafts being connected to said cam and the other being rotated from the vertical shaft which vibrates the needle whereby the correct timing of the needle vibration with the actuation of the bender will be insured.

21. In a sewing machine for blind stitching comprising a bed plate, a work support extending through said bed plate, means for feeding the work across the work support, a curved oscillating needle and complementary stitch forming mechanism located above the work support, a bender reciprocable through said work support, a bender actuating cam located beneath the bed plate in proximity to the bender, a lever pivotally supported at one end beneath said bed plate and having ways adjacent its free end embracing said cam, a bender supporting member and means yieldably connecting said bender supporting member to said lever.

22. In a sewing machine for blind stitching comprising a work support and means for feeding the work across the same, a curved oscillating needle and complemental stitch forming mechanism located above the work support, a bender, means for supporting and actuating said bender comprising a cam, a pivoted member having a yoke embracing said cam, a yieldable member carried by said yoke and adjustable means connecting said yieldable member to said bender.

23. In a sewing machine for blind stitching comprising a work support and means for feeding the work across the same, a curved oscillating needle and complemental stitch forming mechanism located above the work support, a bender, means for supporting and actuating said bender comprising a cam, a pivoted member having a yoke embracing said cam, a yieldable member carried by said yoke, means connecting said yieldable member to said bender and means for vertically adjusting said bender comprising a lever pivotally mounted on said yieldable member, and means for varying the position of said lever.

24. In a sewing machine for blind stitching comprising a work support and means for feeding the work across the same, a curved oscillating needle and complemental stitch forming mechanism located above the work support, means for actuating the same, a bender, means for supporting said bender including a bell crank lever, a lever connecting one arm of said bell crank lever to said bender, actuating means for said bender connected to said lever intermediate its ends, an adjusting cam engaging the other arm of said bell crank lever, and means for positioning said cam.

25. In a sewing machine for blind stitching comprising a work support and means for feeding the work across the same, a curved oscillating needle and complemental stitch forming mechanism located above the work support, means for actuating the same, a bender, means for supporting said bender including a bell crank lever, a lever connecting one arm of said bell crank lever to said bender, actuating means for said bender connected to said lever intermediate its ends, an adjusting cam engaging the other arm of said bell crank lever, and a milled disk connected to said cam having a portion of its surface exposed to permit ready adjustment of said adjusting cam.

In testimony whereof, I have signed my name to this specification, in the presence of two subscribing witnesses.

THOMAS J. HAYES.

Witnesses:
 FREDERICK A. TENNANT,
 THOMAS J. DRUMMOND.